(No Model.)
D. McKENZIE.
TIRE INFLATOR.
No. 550,837. Patented Dec. 3, 1895.
Fig. 1
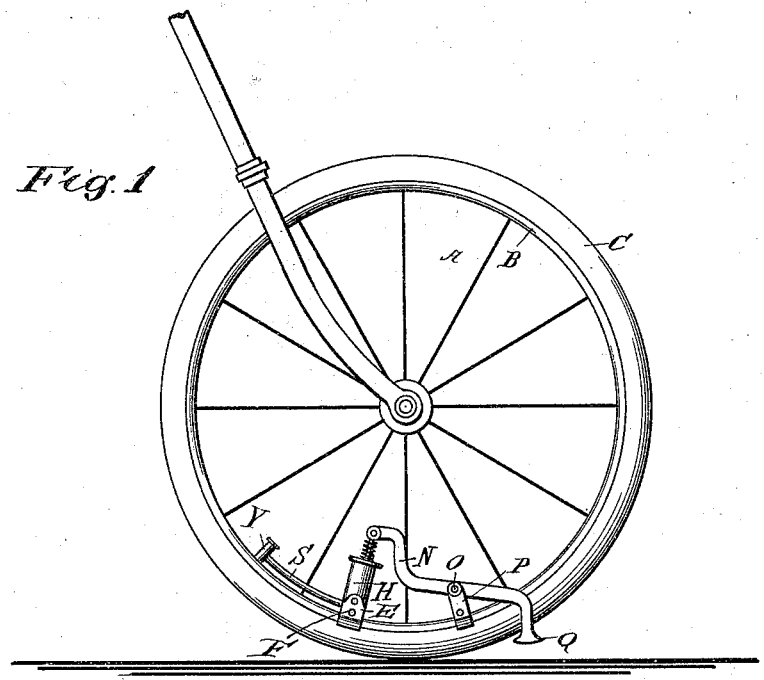
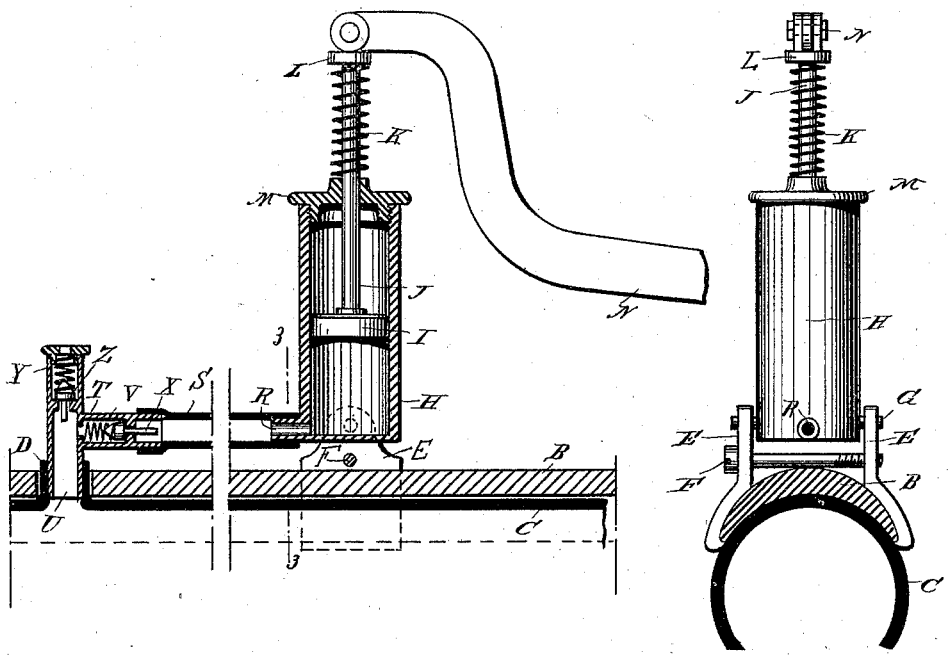
WITNESSES: Fig. 2
Joshua Bergstrom
John Lotka
Fig. 3
INVENTOR
D. McKenzie
BY Munn & Co.
ATTORNEYS.

UNITED STATES PATENT OFFICE.

DONALD McKENZIE, OF LONDON, CANADA.

TIRE-INFLATOR.

SPECIFICATION forming part of Letters Patent No. 550,837, dated December 3, 1895.

Application filed March 12, 1895. Serial No. 541,484. (No model.)

*To all whom it may concern:*

Be it known that I, DONALD MCKENZIE, of London, in the Province of Ontario and Dominion of Canada, have invented a new and Improved Tire-Inflator, of which the following is a full, clear, and exact description.

My invention relates to devices or pumps for inflating tires of velocipedes and other vehicles, and has for its object to provide means whereby such tires will be automatically inflated and kept in an inflated condition.

To this end my invention consists of an inflating device provided with an operating part projecting beyond the tread or outer surface of the tire, so that the said operating part will periodically come in contact with the ground during the revolution of the wheel and thus automatically operate the air-pump or equivalent device.

The invention also consists of certain features of construction and combinations of parts, that will be hereinafter described and claimed.

Reference is to be had to the accompanying drawings, forming a part of this specification, in which similar letters of reference indicate corresponding parts in all the views.

Figure 1 is a broken side elevation showing the invention applied to the front wheel of a bicycle. Fig. 2 is a longitudinal section of part of the tire and the air-pump, and Fig. 3 is a transverse section thereof on the line 3 3 of Fig. 2.

A designates the wheel, B the rim thereof, and C the tire, the latter being provided with the usual nipple D. (See Fig. 2.) On the rim B are mounted two clips E, held together and fastened in position by means of a screw F or other suitable means. In the said clips are journaled trunnions G, projecting from a cylinder H, which forms a part of the air-pump. In the cylinder is mounted the reciprocating piston I, having a piston-rod J projecting therefrom, a spring K, which is coiled between a collar L on the piston-rod, and a cylinder-cover M, serving to throw the piston I into an upward position. The piston-rod J is pivotally connected with an operating-lever N, fulcrumed at O upon brackets P, which are secured to the rim B. The operating-lever has its free end projecting beyond the outer surface of the tire, thereby forming a toe or shoe Q, as indicated in Fig. 1, for a purpose to be stated hereinafter.

The pump-cylinder H is provided with an outlet R, on which is fixed a flexible tube S, the other end of which is connected to a T or elbow T, one arm of the said T entering the nipple D of the tire, as shown at U, another arm, designated V, connecting with the tube S and being provided with a spring-pressed inlet-valve X, and a third arm Y, which is apertured at its top, being provided with a safety-valve Z, which is likewise spring-pressed, as shown.

The operation of the device is as follows: When the wheel A is rotated, the shoe Q of the lever N will periodically come in contact with the ground over which the wheel is traveling, since the said shoe projects beyond the outer or tread surface of the wheel. The pump-piston I will therefore be operated once for every revolution of the wheel, and in this manner the tire, after having been once inflated, will be kept in an expanded condition and it will not be necessary for the rider of the bicycle or the occupant of the vehicle to dismount occasionally for the purpose of inflating the tire, as it has been heretofore. When the tire is fully inflated, it will be obvious that the further working of the air-pump would be liable to burst the tire, and for this purpose I have provided the safety-valve Z, so that the continuous operation of the pump during the movement of the vehicle will not injure the tire.

It will be understood that the details of my invention may be varied without departing from the nature thereof.

Having thus described my invention, I claim as new and desire to secure by Letters Patent—

1. In an inflating device for vehicle tires, the combination of a pump pivotally mounted on the wheel, an operating lever having a constant fulcrum on the wheel and positively connected to the pump, whereby the pump is made to swing with the lever, and a connection between the pump and tire, substantially as described.

2. In an inflating device for vehicle tires, the combination of a pump pivotally mounted on the wheel, a lever pivotally mounted on the wheel, connected to the pump and having one end extended beyond the outer surface of the tire, and a connection between the pump and tire, substantially as described.

3. In an inflating device for vehicle tires, the combination of a pump cylinder having one end pivotally connected to the inner side of the wheel rim, a piston and a rod within the pump, a lever fulcrumed to the inner side of the wheel tire and having one end connected to the piston rod and having its remaining end formed with a shoe projected beyond the outer surface of the tire, and a flexible air passage connecting the pump cylinder and the tire, substantially as described.

4. In an inflating device for vehicle tires, the combination of a pump cylinder having one end pivotally secured to the inner side of the wheel rim and having said end formed with a bossed opening, a flexible tube connected to said boss opening and to the nipple of the tire, a piston and rod within the pump cylinder, and a lever fulcrumed to the inner side of the wheel tire and having one end connected to the piston rod and having its remaining end formed with a shoe and projected beyond the outer side of the tire, substantially as described.

DONALD McKENZIE.

Witnesses:
BENJAMIN BAYLY,
CLAY D. MANVILLE.